March 8, 1938. A. M. CANDY 2,110,436
CONTROL SYSTEM
Filed May 22, 1936 3 Sheets-Sheet 1

Inventor:
Albert M. Candy.
By Brown Jackson Boucher Dennis
Attys

March 8, 1938.  A. M. CANDY  2,110,436
CONTROL SYSTEM
Filed May 22, 1936  3 Sheets-Sheet 2

Inventor:
Albert M. Candy.

March 8, 1938.  A. M. CANDY  2,110,436
CONTROL SYSTEM
Filed May 22, 1936  3 Sheets-Sheet 3

Inventor
Albert M. Candy.
By Brown Jackson Boucher Dunn
Attys

Patented Mar. 8, 1938

2,110,436

UNITED STATES PATENT OFFICE 2,110,436

CONTROL SYSTEM

Albert M. Candy, La Grange, Ill.

Application May 22, 1936, Serial No. 81,229

19 Claims. (Cl. 171—119)

My invention relates generally to electric control systems, and it has particular relation to arc welding control circuits.

Alternating current is being used to a greater extent than heretofore for performing arc welding operations. There have been certain practical operating conditions which it has been necessary to overcome in order to provide a system which will operate satisfactorily from the standpoint of the welding operator who, in the final analysis, is the one that determines whether this system will go into still further widespread use or whether it shall be abandoned, except for certain particular applications. I have been able to overcome the last barrier in this field and to organize an alternating current arc welding system which has all of the desired operating characteristics and which has met with widespread approval in the welding industry.

In order to obtain the best operating conditions in using an alternating current welding system, the open circuit voltage should be between 80 and 120 volts. That is, the transformer which is used to connect the welding circuit to an alternating current source should be designed to apply an open circuit voltage to the welding circuit in this range in order to facilitate striking and maintaining the welding arc. While the welding operation is being performed, the voltage across the welding circuit corresponds to that necessary to maintain the arc, and is of the order of 40 to 30 volts or less, depending upon the welding conditions.

While the voltage across the welding circuit during the time when the welding operation is being performed is not dangerous, the relatively high open circuit voltage which is present across the welding circuit, when it is not used for welding, constitutes a hazard. The presence of this high voltage has been an obstacle which it has been necessary to overcome in order to permit the alternating current welding system to receive the approbation of the welding operators. This has been effected by providing a low voltage tap on the secondary winding of the welding transformer which is arranged to be automatically connected to the welding circuit a predetermined time after the welding operation ceases to permit a certain sequence of operations to be initiated on a subsequent completion of the welding circuit, as by striking the welding electrode on the work, to reconnect the welding circuit to the full open circuit voltage. The high open circuit voltage is then applied to the welding circuit only during a very short interval, although the high open circuit voltage condition is always available while the welding operation is being performed to maintain the welding arc.

The transfer of the welding circuit from the low voltage tap to across the entire secondary winding should take place substantially instantaneously on striking the welding electrode on the work. There should be no delay in effecting the application of the high open circuit voltage connection to the welding circuit to permit the initiation of the welding operation. The transfer should take place on even a slight contact of the electrode with the work as is often the case when the work may have a coating of scale or other material tending to provide a comparatively high resistance path to the flow of current from the low voltage tap. The systems of the prior art, of which I am aware had this inherent difficulty. For their use, it was necessary to provide a comparatively low resistance path through which the welding circuit was completed in order to effect the transfer to the high open circuit voltage condition and even then, in some instances, other precautions had to be taken in order to initiate the welding operation.

It is, therefore, an object of my invention, generally stated, to provide an arc welding control system which shall be simple, safe, efficient, and substantially instantaneous in operation, and which can be readily and economically manufactured and installed.

The principal object of my invention is to provide for substantially instantaneously transferring a welding circuit from a low open circuit voltage condition to a high open circuit voltage condition on even a partial completion of the welding circuit.

An important object of my invention is to provide for positively effecting the deenergization of a control relay in an arc welding control system on completion of the welding circuit to effect the application of a relatively high operating voltage thereto.

A further object of my invention is to provide for increasing the speed of response of an arc welding control system on completion of the welding circuit to apply thereto a relatively high operating voltage.

Still another object of my invention is to provide for increasing the speed of operation of a time delay device used to maintain a relatively high operating voltage on a welding circuit during an interval after the welding operation ceases in effecting the application of the relatively high voltage to the welding circuit to initiate the welding operation.

A specific object of my invention is to provide a control relay with break contact members through which its operating winding is energized from the low voltage tap of the secondary winding of a welding transformer to insure complete deenergization thereof on completion of the welding circuit to initiate the welding operation.

Other objects of my invention will, in part, be obvious and, in part, appear hereinafter.

My invention, accordingly, is disclosed in the embodiments hereof shown in the accompanying drawings, and is comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which.

Figure 1:
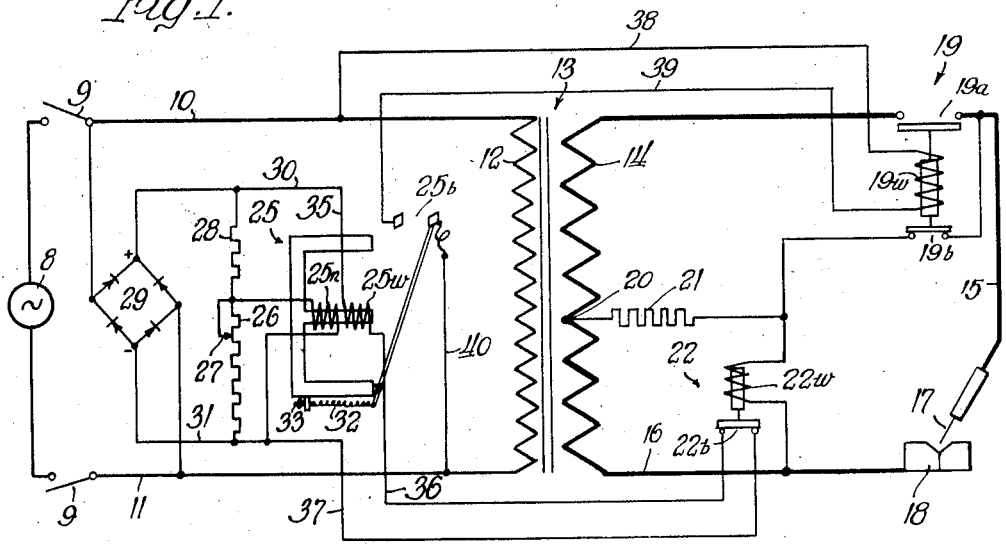
Figure 1 illustrates diagrammatically an arc welding control system of the prior art in which there are certain inherent operating difficulties.

According to the prior art, an electro-magnetically operated line switch has been provided for connecting the secondary winding of a welding transformer to energize a welding circuit. The operating winding of the line switch is energized by means of a time delay relay which is arranged to maintain the line switch in the closed position for a predetermined interval after the welding operation has ceased. The time delay is provided to permit the operator to restrike the arc in the event that it should be extinguished, and to assist him in initially striking the arc to begin the welding operation. The time delay relay is controlled by means of a voltage responsive control relay, the operating winding of which is arranged to be connected to a low voltage tap on the secondary winding of the welding transformer. The control relay is provided with break contact members which are held open as long as a sufficient operating voltage is applied to its operating winding and which, on being bridged, complete an energizing circuit for the operating winding of the time delay relay.

As long as the welding operation is not being performed, the voltage which is applied to the operating winding of the control relay from the low voltage tap is sufficient to attract its armature and to maintain its contact members in the open condition. As soon as the welding circuit is completed, as by striking the welding electrode on the work, the operating winding of the control relay is short-circuited and the contact members thereof are bridged to effect the operation of the time delay relay and, in turn, the operation of the line switch. In the energized condition, very little energy is required to maintain the armature of the control relay in operated position. I have discovered that it is necessary to provide a comparatively low resistance shunt path around the operating winding of the control relay in order to effect the desired operation of this relay. Thus, when the welding circuit is completed by touching the welding electrode on work on which there may be scale or other high resistance material, the shunt path around the operating winding of the control relay may be of such high resistance that it will not be sufficiently deenergized to effect its control function. Since this shunt circuit also includes break contact members on the line switch which are employed to connecting the welding circuit to the low voltage tap while the welding operation is not being performed, the resistance of this path is further increased when these contact members become slightly oxidized after continued service.

According to my invention, I have provided for effecting the complete deenergization of the operating winding of the control relay as soon as the shunt circuit is even partially completed, as by providing a relatively high resistance path for shunting down the operating winding of the control relay. The control relay is provided with a set of make contact members, by means of which the operating winding thereof is connected to the low voltage tap on the secondary winding of the welding transformer. These contact members are so arranged that even a slight momentary diminution in the current flowing through the control relay operating winding will cause these contact members to be separated, with the result that this winding is fully deenergized, and consequently the sequence of operations for closing the line switch will be immediately initiated. With a view to further increasing the speed of response of the system, I have provided for opening the energizing circuit for the neutralizing winding of the time delay relay during non-operation thereof so that there will be no opposition to the closing action of the main operating winding thereof on energization by the bridging of the break contact members of the control relay.

In another embodiment of my invention I have provided the control relay with an accelerating winding which is arranged to oppose the effects of its operating winding when the welding circuit is completed. This winding may be used in conjunction with the self holding contact members of the control relay, or it may be used in the prior art system for securing the deenergization of the control relay without employing the self holding contact members. In either connection the sensitivity of response of the control relay will be increased on the completion of the welding circuit either momentarily or through a high resistance path.

Referring now particularly to Figure 1 of the drawings, a welding system of the prior art is illustrated in order to point out the advantages and novel features of my invention thereover. As shown, a source of alternating current 8, such as a 60 cycle generator, is provided, and may be connected by switches 9 to energize conductors 10 and 11 across which the primary winding 12 of a welding transformer, shown generally at 13, may be connected. The transformer 13 is provided with a secondary winding 14 for energizing a welding circuit comprising conductors 15 and 16 that may be connected respectively to a welding electrode 17 and work 18 on which the welding operation is to be performed. In order to control the connection of the conductor 15 to the secondary winding 14, a line switch, shown generally at 19, is provided having main contact members 19a, auxiliary break contact members 19b, and an operating winding 19w. The auxiliary contact members 19b are arranged to be bridged after the contact members 19a are opened to connect the conductor 15 to a low voltage tap 20 on the secondary winding 14 through a protective resistor 21 to provide a shunt circuit around the operating winding 22w of a control relay, shown generally at 22 and having break contact members 22b.

The control relay 22, through its contact members 22b, is arranged to control the energization of the operating winding 25w of a time delay relay, shown generally at 25. The time delay relay 25 may be of the type shown and described in Patent No. 1,753,983, issued to W. G. Cook, April 8, 1930. The time delay relay 25 is provided with make contact members 25b which are arranged to be closed on energization of the operating winding 25w and to be maintained closed for a predetermined interval after deenergization of the operating winding 25w. The time delay relay 25 is provided with a neutralizing winding 25n which is connected for energization across a potentiometer 26 having a movable contact member 27, and which is connected in series circuit relation with a resistor 28 across the terminals of a rectifier, shown generally at 29, which may be of the copper oxide type and which may be connected for energization across the conductors 10 and 11, as illustrated. The rectifier 29 is arranged to energize conductors 30 and 31 with direct current for effecting certain control functions, as will be set forth hereinafter. The time interval during which the contact members 25b are maintained closed may be adjusted either by moving the connection 27 along the potentiometer 26 or by adjusting the tension of a spring 32 by means of a thumb nut 33.

In describing the operation of the system shown in Figure 1 of the drawings, it will first be assumed that the welding electrode 17 is out of engagement with the work 18 and that the switches 9 are closed to energize the primary winding 12 from the alternating current source 8. The rectifier 29 is immediately energized, and conductors 30 and 31 have a direct current voltage applied thereto. The main operating winding 25w of the time delay relay 25 is then immediately energized over a circuit which may be traced from the energized conductor 30 to conductor 35, operating winding 25w, conductor 36, contact members 22b, conductor 37, to the energized conductor 31. Contact members 25b of the time delay relay 25 are then bridged to complete an energizing circuit for the operating winding 19w of the line switch 19. This circuit may be traced from the energized conductor 10 through conductor 38, winding 19w, conductor 39, contact members 25b, and conductor 40, to the energized conductor 11.

Since it has been assumed that the welding electrode 17 is out of engagement with the work 18, the voltage which appears between the low voltage tap 20 of the secondary winding 14 and the conductor 16 will be sufficient to energize the operating winding 22w of the control relay 22. As a result, the contact members 22b will immediately be opened to open the previously traced energizing circuit for the operating winding 25w of the time delay relay 25 and, when the interval has expired for which this relay is adjusted, contact members 25b will be opened to open the previously traced energizing circuit for the operating winding 19w of the line switch 19. The line switch 19 will then be restored to the non-operated position.

When the welding operator desires to initiate the welding operation, he strikes the welding electrode 17 on the work 18. It will be observed that this completes a shunt circuit around the operating winding 22w of the control relay 22 through the break contact members 19b of the line switch 19. The effectiveness of this shunt circuit depends upon the resistance thereof. Since very little energy is required to maintain the control relay 22 in the operated position, once it has been moved to that position, the resistance of the shunt circuit must be comparatively low. I have found that it is difficult, if not impossible, to provide a sufficiently low resistance shunt path around the operating winding 22w without going to considerable trouble to scrape away the relatively high resistance surface of the work 18 or to remove a portion of the coating which may be present on the welding electrode 17. Furthermore, electrode 17 must be held in good contact with the work 18 for a sufficiently long period of time to permit relay 22 to move (in its decreased magnetic field) to its operative position for establishing contacts 22b. Momentary contact of electrode 17 with the work 18 will merely result in a very slight downward movement of relay 22 immediately followed by an upward movement without establishing contacts 22b. It has been demonstrated that, when an electrode is struck against the work, a series of sparks will result due to unavoidable movement or rolling action of the electrode on the work. Very small particles of insulating slag or other material make it difficult to establish more than momentary contact between the electrode 17 and the work 18.

Moreover, there is a tendency for the contact members 19b of the line switch 19 to become oxidized, thereby increasing the contact resistance thereof. In some cases it has been necessary to dismantle a portion of the welding equipment in order to render these contact members accessible for cleaning.

The combined effect of the high resistance shunt path caused by poor contact engagement between the electrode and the work 18 and by the contact members 19b has been such as to render the system shown in Figure 1 of the drawings undesirable and practically inoperable from the standpoint of the welding operator. While it is essential that the welding operator be safeguarded against the effects of the voltage which would be applied to the welding circuit if the line switch 19 were not employed, it is equally essential that the system be so arranged that the operating voltage may be applied thereto substantially instantaneously after the operator strikes the welding electrode 17 on the work 18. If the operator is required to scrape away a portion of the surface of the work 18 each time that he wishes to initiate the welding operation and to periodically adjust the contact members 19b, it will be readily understood that such a system will be highly impractical, will meet with little favor in the industry, and will not remain long on the market. This has been the case with the system shown in Figure 1 of the drawings.

Figure 2:
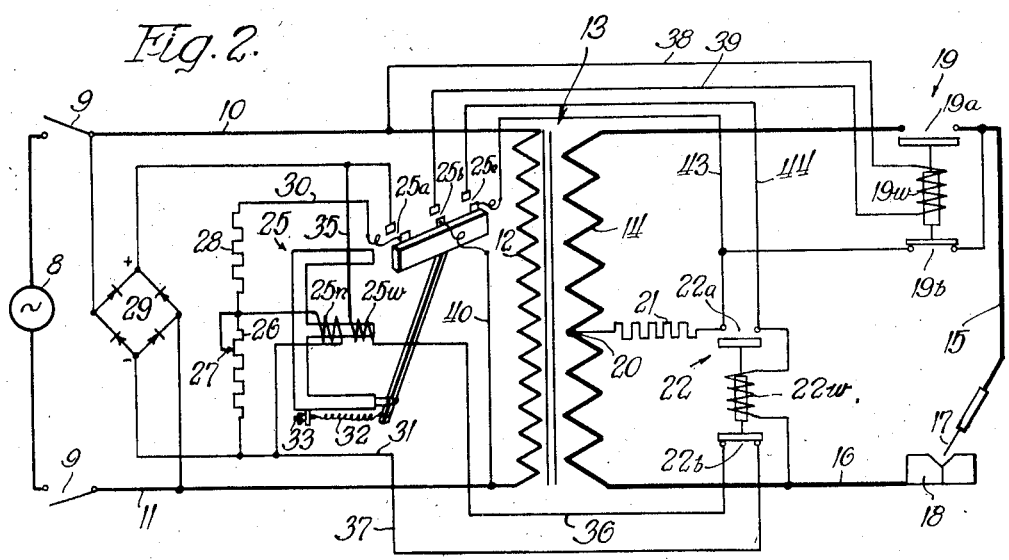
Figure 2 illustrates diagrammatically an arc welding control system embodying the features of my invention by means of which the circuit connections shown in Figure 1 are made operable in a practical manner.

The preferred embodiment of my invention is shown in Figure 2 of the drawings, to which reference may now be had. In order to insure that the operating winding 22w of the control relay 22 will be completely deenergized as soon as the shunt circuit is completed, as by striking the welding electrode 17 on the work 18, even though only momentary contact between the electrode 17 and work 18 is established, and despite the fact that this circuit may be of comparatively high resistance, I have provided a set of make contact members 22a on the control relay 22. These contact members are connected in the energizing circuit for the operating winding 22 between it and the low voltage tap 20 on the secondary winding 14 of the welding transformer 13. As soon as the operating winding 22w is deenergized just sufficiently to permit the contact members 22a to separate, the energizing circuit is fully opened and the control relay 22 immediately drops to the non-operated position. The contact members 22b are then closed to effect the energization of the operating winding 25w of the time delay relay 25 as has been described hereinbefore.

With a view to initiating the operation of the control relay 22, contact members 25c may be provided on the time delay relay 25 which are of the make type and which are closed on operation thereof. These contact members are connected in shunt circuit relation with the contact members 22a by means of conductors 43 and 44 as illustrated.

With a view to increasing the speed of response of the time delay relay 25 on bridging of the contact member 22b, the energizing circuit for the neutralizing winding 25n of the time delay relay 25 is arranged to be opened by means of contact members 25a which are of the make type and which are carried by and operated by the time delay relay 25 as illustrated. Since the neutralizing winding 25n opposes the action of the operating winding 25w and, further, since it is required only in conjunction with effecting the time delay feature of this relay, the deenergization thereof until after the energization of the operating winding 25w will tend to speed up the operation of this relay.

In describing the operation of the system shown in Figure 2 of the drawings embodying my invention, it will be assumed that the switches 9 have been closed and that the system is ready for use in performing the welding operation. Under these conditions, the operating winding 22w is connected through make contact members 22a to the low voltage tap 20 on the secondary winding 14. The welding circuit, in this case conductor 15, is connected through the break contact members 19b on the line switch 19 to this same tap. The time delay relay 25 is in the non-operated position, since the energizing circuit for the operating winding 25w is open at contact members 22b. The neutralizing winding 25n is also deenergized since contact members 25a are in the open position.

As soon as the operator strikes the electrode 17 on the work 18, the shunt circuit is completed around the operating winding 22w of the control relay 22. Even though this shunt circuit may be of relatively high resistance and may only be established momentarily, there will be some slight diminution in the flow of current to the operating winding 22w. This will be sufficient to cause a slight movement in the armature of this relay even though it might not be sufficient to permit its movement to such a position that contact members 22b would be bridged. However, the control relay 22 may be so adjusted that this slight movement will effect the opening of the contact members 22a, with the result that the operating winding 22w is completely deenergized since the circuit between it and the low voltage tap 20 is broken, and, as a result, the control relay 22 is restored to the non-operated position and contact members 22b are bridged. The left hand side of contact members 19b is connected directly to the resistor 21 to avoid drawing the starting circuit current through contact members 22a which ordinarily have relatively small current carrying capacity.

The operating winding 25w of the time delay relay 25 is then energized. Since the neutralizing winding 25n is not energized, the response of this relay to the energization of the operating winding 25w is hastened and, consequently, contact members 25b are more quickly closed to effect the energization of the operating winding 19w of the line switch 19.

The welding circuit is now connected across the full secondary winding 14, and the open circuit voltage thereof is available for initiating the welding operation in case the operator has not maintained the electrode 17 in arcing engagement with the work 18. At contact members 25c an energizing circuit is completed for the operating winding 22w. The contact members 22b are then opened and the energizing circuit for the operating winding 25w is opened. However, due to the time delay characteristics of the relay 25, its contact members are not immediately opened. If, however, the welding operator either maintains the welding electrode 17 in arcing engagement with the work 18 or, after having effected the closure of the line switch 19, he again brings it into arcing engagement, welding current flows, and the voltage existing between the low voltage tap 20 and the conductor 16 is not sufficient to maintain the operating winding 22w of the control relay 22 energized to the extent necessary to bridge contact members 22a and open contact members 22b. As a result, contact members 22b are again bridged and remain in this condition as long as the welding operation is carried out. Although the operating winding 22w may have applied thereto sufficient operating voltage to open the contact member 22b while the welding operation is not being performed for short intervals, the time delay characteristic of the relay 25 is such that its contact members 25b will not be opened, and, therefore, will not deenergize the operating winding 19w of the line switch 19. As soon as the welding operation is terminated for an interval which is longer than that for which the relay 25 is adjusted, its contact members 25b will be opened and the operating winding 19w of the line switch will be deenergized. The conductor 15 will then be disconnected from the secondary winding 14 to remove the high open circuit voltage therefrom, and it will be connected at contact members 19b to the low voltage tap 20.

Figure 3:
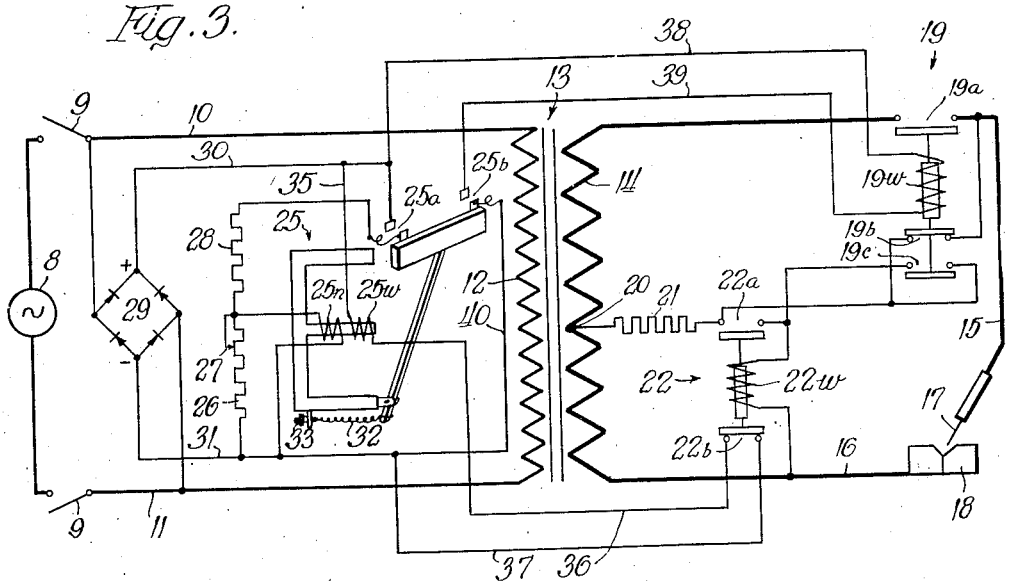
Figure 3 illustrates diagrammatically a modification of the circuit connections shown in Figure 2.

Referring now particularly to Figure 3 of the drawings, it will be observed that the circuit connections there shown are identical with those shown in Figure 2, with the exceptions that the contact members 25c are omitted from the time delay relay 25, that a set of make contact members 19c has been added to the line switch 19, and that the operating winding 19w is energized from the rectifier 29. Since it is desirable that an energizing circuit for the operating winding 22w of the control relay 22 be completed while the welding operation is being performed, or immediately thereafter, use may be made either of the time delay relay 25 or of the line switch 19, since both of these devices are energized at the same time. Therefore, in this embodiment of the invention, the contact members 19c are connected in shunt circuit relation to the make contact members 22a of the control relay 22.

Since the functioning of the system shown in Figure 3 is otherwise identical with that described hereinbefore in connection with Figure 2 of the drawings, a detailed description thereof will not be set forth.

Figure 4:
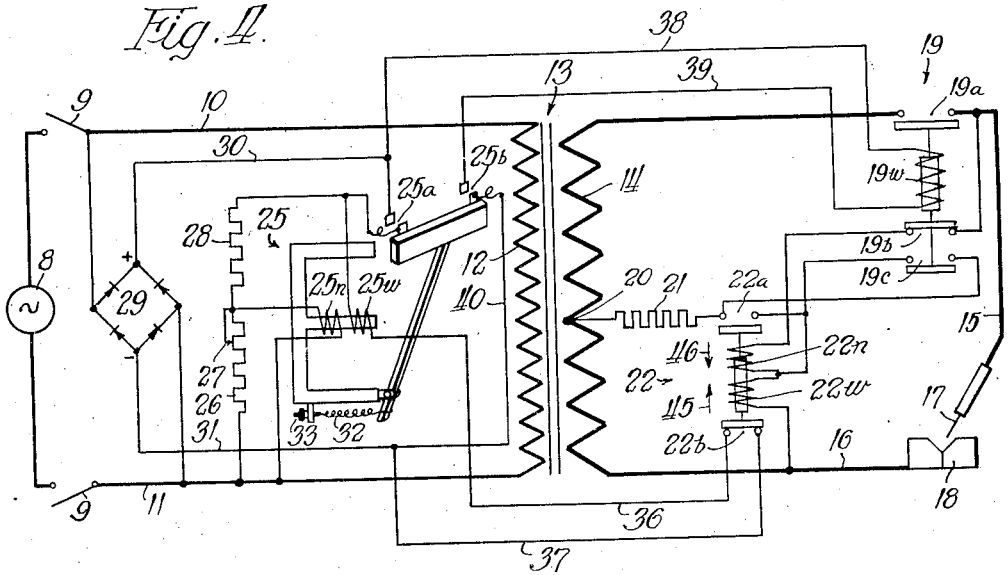
Figure 4 illustrates diagrammatically still another modification of my invention.

Referring now particularly to Figure 4 of the drawings, it will be observed that a system is shown which is essentially the same as that illustrated in Figure 3 except that the control relay 22 is provided with a neutralizing winding 22n. The action of the operating winding 22w is indicated by the arrow 45, while the opposite action of the neutralizing winding 22n is illustrated by the arrow 46. On completion of the shunt circuit by striking the welding electrode 17 on the work 18, the neutralizing winding 22n is energized. Since the magnetic action of this winding opposes that of the operating winding 22w, the movement of the armature of the control relay 22 to the non-operated position is insured at an accelerated rate above that due to gravity on the relay armature. While the neutralizing winding 22n may be used in some instances to insure the response of the control relay 22 to the completion of the shunt circuit, it is not essential to the proper functioning of such a system as is shown in Figure 2 of the drawings. However, its use may be desirable for some applications.

Figure 5:
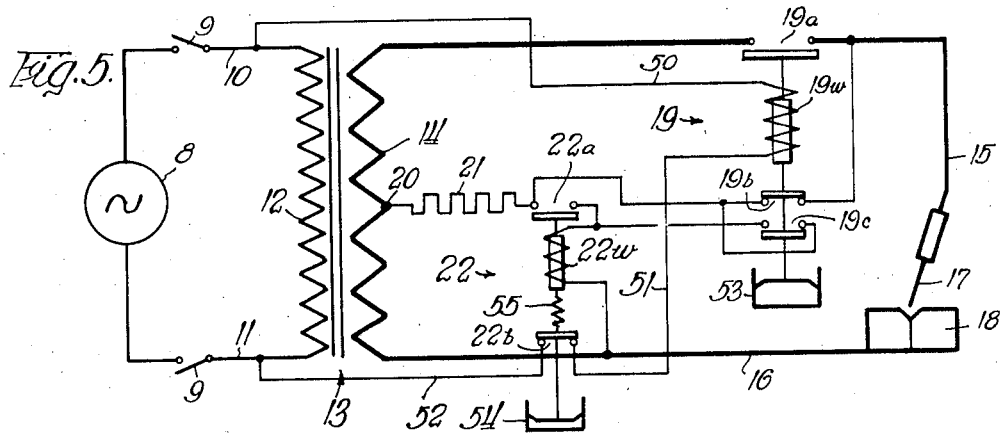
Figures 5, 6 and 7 illustrate diagrammatically how my invention can be practised without using the time delay relay shown in Figures 1, 2, 3 and 4.
Figure 6:
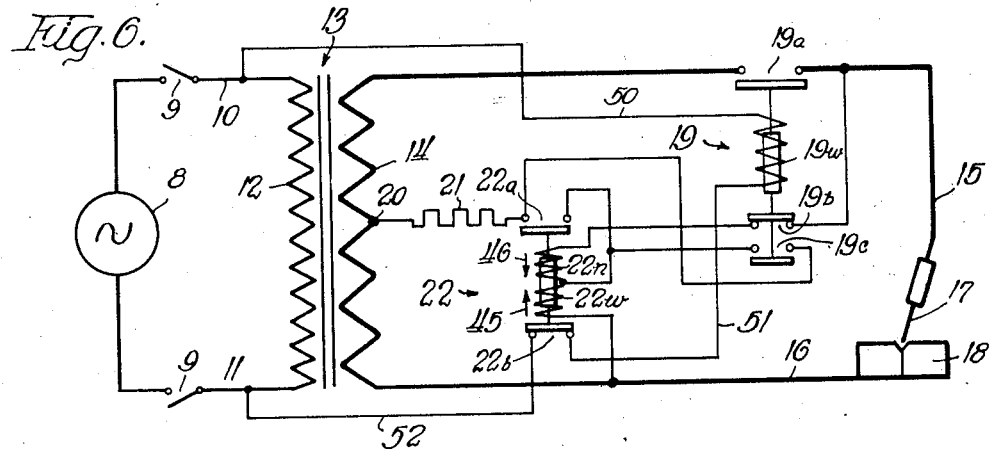
Figure 7:
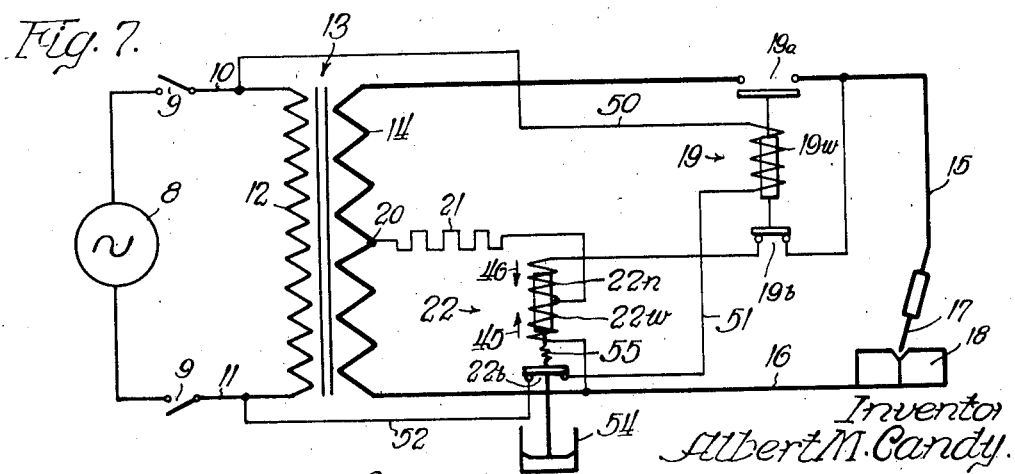

The use of the time delay relay 25, as shown in Figures 2, 3, and 4, is, of course, desirable, since it prevents the opening of the line switch 19, except at the end of an interval of considerable length after the welding operation ceases. However, it will be understood that this relay may be omitted without seriously interfering with the desired functioning of the system, and it is intended to so claim the invention. In Figures 5, 6 and 7, I have shown circuits embodying my invention which do not require the time delay relay 25, but a time delay means may be incorporated for controlling either or both the relay 22 and the main switch 19, principally to save wear and tear on switch 19 due to momentary interruptions in the welding arc. A description of the functioning of these circuits will now be set forth.

Referring particularly to Figure 5 of the drawings, it will be observed that a circuit is there shown which is similar to the circuits shown in Figures 2 and 3 of the drawings, the time delay relay 25 being omitted. It will be noted that the operating winding 19w is connected at one terminal for energization from the conductor 10 by the conductor 50, and that the other terminal is connected to the right hand side of the contact members 22b of the control relay 22 by a conductor 51. The left hand side of the contact members 22b is connected by conductor 52 to the line conductor 11. If it is desired to provide a time delay in the opening of the line switch 19, a dash-pot 53 may be provided as illustrated, which is so arranged as to permit the closure of the line switch 19 without delay, but which will prevent the immediate opening thereof on deenergization of the operating winding 19w.

In order to operate the system shown in Figure 5 of the drawings, the switches 9 are closed to energize the transformer 13. The operating winding 19w of the line switch 19 is immediately energized since contact members 22b are now bridged. Contact members 19c are closed to complete an energizing circuit for the operating winding 22w of the control relay 22 from the low open circuit voltage tap 20 of the secondary winding 14. As a result of the energization of the operating winding 22w, contact members 22b are opened, and the energizing circuit for the operating winding 19w is opened and the line switch 19 moves to the open position as controlled by the dash-pot 53 if it is used. It will be understood that the use of the dash-pot 53 is desirable or its equivalent, but may not be necessary if the inherent operation of the line switch 19 and the control relay 22 is such as to provide the desired functioning. At contact members 22a a holding circuit for the operating winding 22w is completed, and the control relay 22 remains in the operated position.

When it is desired to initiate the welding operation, the electrode 17 is caused to momentarily engage the work 18, and the operating winding 22w is shunted down as described hereinbefore. At contact members 22a the energizing circuit for the operating winding 22w is immediately opened, and there is no delay in effecting the closure of the line switch 19.

Further time delay may be incorporated in the functioning of the control relay 22 by the provision of a dash-pot 54 which is arranged to delay the opening of contact members 22b on energization of the operating winding 22w. A tension spring 55 serves to interconnect the bridging contact member with the armature of the relay as illustrated. By adjusting the dash-pot 54 and the tension of the spring 55, sufficient time delay may be obtained to prevent the deenergization of the operating winding 19w and dropping out of the switch 19 until an appreciable time elapses after the welding circuit is broken, thereby preventing pumping of the switch 19.

It will be understood that either, both, or neither of the dash-pots 53 and 54 may be used, depending upon the type of operation desired. Moreover, it will be understood that other types of time delay apparatus may be used in lieu of the dash-pots 53 and 54, since they are used merely to illustrate a means whereby time delay may be obtained.

In Figure 6 the circuit connections there shown are a modification of those illustrated in Figure 4 of the drawings. It will be observed that the time delay relay 25 has been omitted and that the contact members 22b of the control relay 22 are employed to directly control the energization of the operating winding 19w of the line switch 19. The neutralizing winding 22n serves to oppose the action of the operating winding 22w on the closure of the welding circuit, and the speed of operation of the control relay 22 is increased. Since the functioning of the system shown in Figure 6 of the drawings is otherwise substantially the same as that described hereinbefore for Figure 5, a detailed description will not be set forth.

In Figure 7 of the drawings, a circuit is shown which is somewhat similar to the circuit shown in Figure 1 of the drawings, except for the omission of the time delay relay 25 and the addition of the neutralizing winding 22n on the control relay 22. Because of the provision of the neutralizing winding 22n, it may be unnecessary to provide contact members, the contact members 22a, for positively effecting the deenergization of the operating winding 22w on the momentary closure of the welding circuit. That is, sufficient current may be caused to flow through the neutralizing winding 22n on the completion of the welding circuit through a relatively high resistance path as will permit the armature of the control relay 22 to drop sufficently far to bridge the contact members 22b.

In the system shown in Figure 7 of the drawings, as soon as the switches 9 are closed the operating winding 19w of the line switch 19 is energized since, at this time, contact members 22b will be bridged. Assuming that the welding operation is not at this instant initiated, sufficient voltage will be available between the low voltage tap 20 and the conductor 16 to energize the operating winding 22w of the control relay 22. As a result, contact members 22b will be opened, and the energizing circuit for the operating winding 19w will be opened and the line switch 19 will drop out. As soon as the welding circuit is completed, the neutralizing winding 22n will be energized through contact members 19b, and due to this fact and the shunt circuit which is completed therethrough around the operating winding 22w, the contact members 22b will be bridged and the operating winding 19w will again be energized. Contact members 22b will remain closed as long as the welding operation continues, since sufficient voltage will not be available between the low voltage tap 20 and the conductor 60 to energize the operating winding 22w to the extent required for the operation thereof. However, as soon as the welding operation ceases, sufficient voltage will be available for energizing the operating winding 22w to the required extent, and contact members 22b will be opened. As a result, the operating winding 19w will be deenergized, and the line switch 19 will be opened.

If so desired, the control relay 22, shown in Figure 7 of the drawings, may be provided with the dash pot 54 and the spring 55 for delaying the opening of contact members 22b, as illustrated. Momentary energization of the operating winding 22w due to momentary interruption of the welding arc will then not cause the contact members 22b to open the energizing circuit for the operating winding 19w of the line switch 19. Consequently the relatively heavy contact members 19a will not be subject to the wear and tear that might otherwise result if this time delay were not introduced.

Since certain further changes may be made in the above constructions, and different embodiments of the invention may be made without departing from the scope thereof, it is intended that all matter contained in the above description or shown in the accompanying drawings shall be interpreted as illustrative and not in a limiting sense.

I claim as my invention:

1. A system for controlling the energization of an intermittently loaded power circuit comprising, in combination, switch means for connecting said power circuit to a source of relatively high open circuit voltage, means for applying a relatively low open circuit voltage to said power circuit when it is not loaded, relay means disposed to be responsive to said low open circuit voltage for controlling the operation of said switch means, and accelerating means for increasing the speed of response of said relay means on application of load to said power circuit for effecting the operation of said switch means to energize said power circuit.

2. A system for controlling the energization of an intermittently loaded power circuit comprising, in combination, switch means for connecting said power circuit to a source of relatively high open circuit voltage, means for applying a relatively low open circuit voltage to said power circuit when it is not loaded, relay means disposed to be responsive to said low open circuit voltage for controlling the operation of said switch means, and contact means disposed to be opened on application of load to said power circuit for rendering said relay means non-responsive to said low open circuit voltage to effect the operation of said switch means for energizing said power circuit.

3. A system for controlling the energization of an intermittently loaded power circuit comprising, in combination, switch means for connecting said power circuit to a source of relatively high open circuit voltage, means for applying a relatively low open circuit voltage to said power circuit when it is not loaded, time delay means disposed to substantially instantaneously effect the closure of said switch means and to maintain said switch means closed during a predetermined interval after deenergization thereof, relay means disposed to be responsive to said low open circuit voltage for controlling the energization of said time delay means, and contact means disposed to be opened on application of load to said power circuit for rendering said relay means non-responsive to said low open circuit voltage, thereby effecting the energization of said time delay means for closing said switch means to energize said power circuit.

4. A system for controlling the energization of an intermittently loaded power circuit comprising, in combination, switch means for connecting said power circuit to a source of relatively high open circuit voltage, an application of load thereto, means cooperating with said switch means for connecting said power circuit to a source of relatively low open circuit voltage while said power circuit is not loaded, time delay relay means disposed to substantially instantaneously effect the closure of said switch means and to maintain said switch means closed during a predetermined interval after deenergization thereof, relay means disposed to be responsive to said low open circuit voltage for controlling the energization of said time delay relay means, and contact means disposed to be opened on application of load to said power circuit for fully deenergizing said relay means to effect the energization of said time delay means for closing said switch means.

5. In a system for controlling the energization of an intermittently loaded power circuit comprising, in combination, a switch for connecting said power circuit to a source of relatively high open circuit voltage and an operating winding therefor, contact means operable with said switch for connecting said power circuit to a source of relatively low open circuit voltage when said switch is in the open position, a time delay relay having contact members disposed to complete an energizing circuit for said switch operating winding and an operating winding therefor, said contact members being disposed to remain in engagement a predetermined time after deenergization of said time delay relay operating winding, a control relay and an operating winding therefor, and make and break contact members disposed to be operated by said control relay, said make contact members being disposed to control the connection of said control relay operating winding to said low open circuit voltage source and said break contact members being disposed to control the energization of said time delay relay operating winding.

6. In a system for controlling the energization of an intermittently loaded power circuit comprising, in combination, a transformer having a primary winding for connection to a source of alternating current and a secondary winding provided with a low voltage tap, a switch for connecting said secondary winding to said power circuit and an operating winding therefor, break contact members operable with said switch for connecting said power circuit to said low voltage tap when said switch is in the open position; a time delay relay having contact members disposed to connect said switch operating winding to a control source and an operating winding therefor, said contact members being disposed to remain in engagement a predetermined time after deenergization of said time delay operating winding; a control relay and an operating winding therefor; and make and break contact members disposed to be operated by said control relay, said make contact members being disposed to control the connection of said relay operating winding to said low voltage tap on application of load to said power circuit to effect complete deenergization thereof and said break contact members being disposed to connect said time delay relay operating winding to said control source.

7. In a system for controlling the energization of an intermittently loaded power circuit comprising, in combination, a transformer having a primary winding for connection to a source of alternating current and a secondary winding provided with a low voltage tap, a switch for connecting said secondary winding to said power circuit and an operating winding therefor, break contact members operable with said switch for connecting said power circuit to said low voltage tap when said switch is in the open position; a time delay relay and an operating winding therefor, a neutralizing winding on said time delay relay for opposing the action of said operating winding thereof, a plurality of sets of make contact members disposed to be operated by said time delay relay and to remain in engagement a predetermined time after deenergization of said operating winding thereof, one of said sets of contact members being disposed to connect said switch operating winding to a control source, another of said sets of contact members being disposed to connect said neutralizing winding to said control source; a control relay and an operating winding therefor, another of said sets of contact members being disposed to connect said control relay operating winding to said low voltage tap; and make and break contact members disposed to be operated by said control relay, said make contact members being connected in shunt circuit relation to said last named set of time delay relay contact members for controlling the connection of said relay operating winding to said low voltage tap on application of load to said power circuit to effect complete deenergization thereof and said break contact members being disposed to connect said time delay operating winding to said control source.

8. A system for controlling the energization of an intermittently loaded power circuit comprising, in combination, a transformer having a primary winding for conection to a source of alternating current and a secondary winding provided with a low voltage tap, a switch for connecting said secondary winding to said power circuit and an operating winding therefor, break contact members operable with said switch for connecting said power circuit to said low voltage tap when said switch is in the open position; a time delay relay and an operating winding therefor, a neutralizing winding on said time delay relay for opposing the action of said operating winding thereof, a plurality of sets of make contact members disposed to be operated by said time delay relay and to remain in engagement a predetermined time after deenergization of said operating winding thereof, one of said sets of contact members being disposed to connect said switch operating winding to a control source, another of said sets of contact members being disposed to connect said neutralizing winding to said contol source; a control relay and an operating winding therefor, make contact means operable with said switch to connect said control relay operating winding to said low voltage tap; and make and break contact members disposed to be operated by said control relay, said make contact members being connected in shunt circuit relation to said switch make contact members for controlling the connection of said relay operating winding to said low voltage tap on application of load to said power circuit to effect complete deenergization thereof and said break contact members being disposed to connect said time delay relay operating winding to said control source.

9. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage while said power circuit is not loaded, a control relay and an operating winding therefor, a neutralizing winding on said control relay for opposing the action of the operating winding thereof on application of load to said power circuit, and break contact members disposed to be operated by said control relay for effecting the energization of said switch operating winding.

10. In a system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage while said power circuit is not loaded, a control relay and an operating winding therefor, a neutralizing winding on said control relay for opposing the action of the operating winding thereof on application of load to said power circuit, and make and break contact members disposed to be operated by said control relay, said relay make contact members being disposed to control the connection of said relay operating winding to said low open circuit voltage source and said relay break contact members being disposed to effect the energization of said switch operating winding.

11. In a system for controlling the energization of an intermittently loaded power circuit, in combination, a transformer having a primary winding for connection to a source for alternating current and a secondary winding provided with a low voltage tap, a switch for connecting said secondary winding to said power circuit and an operating winding therefor, break contact members operable with said switch for connecting said power circuit to said low voltage tap when said switch is in the open position, a control relay and an operating winding therefor, a neutralizing winding on said control relay for opposing the action of the operating winding thereof on application of load to said power circuit, and make and break contact members disposed to be operated by said control relay, said relay make contact members being disposed to control the connection of said relay operating winding to said low voltage tap and said relay break contact members being disposed to effect the energization of said switch operating winding.

12. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, make and break contact members disposed to be operated by said control relay, said make contact members being disposed to control the connection of said control relay operating winding to said low open circuit voltage source and said break contact members being disposed to complete an energizing circuit for said switch operating winding, and make contact members connected in parallel with said control relay make contact members and disposed to be operable with said switch.

13. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, make and break contact members disposed to be operated by said control relay, said make contact members being disposed to control the connection of said control relay operating winding to said low open circuit voltage source and said break contact members being disposed to complete an energizing circuit for said switch operating winding, make contact members connected in parallel with said control relay make contact members and disposed to be operable with said switch, and a neutralizing winding on said control relay connected in series circuit relation with said break contact members of said switch for opposing the action of said control relay operating winding.

14. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, make and break contact members disposed to be operated by said control relay, said make contact members being disposed to control the connection of said control relay operating winding to said low open circuit voltage source and said break contact members being disposed to complete an energizing circuit for said switch operating winding, make contact members connected in parallel with said control relay make contact members and disposed to be operable with said switch, and time delay means disposed to cooperate with said switch for delaying the opening thereof after deenergization of its operating winding.

15. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, make and break contact members disposed to be operated by said control relay, said make contact members being disposed to control the connection of said control relay operating winding to said low open circuit voltage source and said break contact members being disposed to complete an energizing circuit for said switch operating winding, make contact members connected in parallel with said control relay make contact members and disposed to be operable with said switch, and time delay means disposed to cooperate with said break contact members of said control relay for delaying the opening thereof after energization of said control relay operating winding.

16. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, break contact members disposed to be operated by said control relay for completing an energizing circuit for said switch operating winding, means for connecting said relay operating winding to said low open circuit voltage source, and a neutralizing winding on said control relay connected in series circuit relation with said break contact members of said switch for opposing the action of said control relay operating winding.

17. A system for controlling the energization of an intermittently loaded power circuit comprising, in combination, switch means for connecting said power circuit to a source of relatively high open circuit voltage, means for applying a relatively low open circuit voltage to said power circuit when it is not loaded, relay means disposed to be responsive to said low open circuit voltage for controlling the operation of said switch means, means for rendering said relay means fully non-responsive to said low open circuit voltage on application of load to said power circuit for effecting the operation of said switch means to energize said power circuit, and contact means disposed to be operated by said switch means for bridging said last named means to automatically initiate operation of said relay means.

18. A system for controlling the energization of an intermittently loaded power circuit comprising, in combination, means for applying a relatively high open circuit voltage to said power circuit when it is loaded, means for applying a relatively low open circuit voltage to said power circuit when it is not loaded, time delay means for controlling said first named means to maintain said high open circuit voltage on said power circuit during a predetermined interval after the load is removed, relay means responsive to said low open circuit voltage for controlling said time delay means, contact means for substantially instantaneously effecting the operation of said relay means on application of load to said power circuit, and additional contact means disposed to be operated by said time delay means for bridging said first mentioned contact means to automatically initiate operation of said relay means.

19. A system for controlling the energization of an intermittently loaded power circuit comprising, in combination, a switch for connecting said power circuit to a source of relatively high open circuit voltage and an operating winding therefor, break contact members operable with said switch for connecting said power circuit to a source of relatively low open circuit voltage when said switch is in the open position, a control relay and an operating winding therefor, break contact members disposed to be operated by said control relay for completing an energizing circuit for said switch operating winding, means for connecting said relay operating winding to said low open circuit voltage source, a neutralizing winding on said control relay connected in series circuit relation with said break contact members of said switch for opposing the action of said control relay operating winding, and time delay means disposed to cooperate with said break contact members of said control relay for delaying the opening thereof after energization of said control relay operating winding sufficient to effect operation thereof.

ALBERT M. CANDY.

CERTIFICATE OF CORRECTION.

Patent No. 2,110,436.　　　　　　　　　　　　March 8, 1938.

ALBERT M. CANDY.

It is hereby certified that error appears in the printed specification of the above numbered patent requiring correction as follows: Page 8, first column, line 1, claim 11, for the word "for" second occurrence, read of; and that the said Letters Patent should be read with this correction therein that the same may conform to the record of the case in the Patent Office.

Signed and sealed this 12th day of April, A. D. 1938.

(Seal)

Henry Van Arsdale,
Acting Commissioner of Patents.